April 28, 1964 E. M. CRAM ETAL 3,130,579
APPARATUS FOR BEND TESTING ELONGATED SPECIMENS
Filed May 22, 1961 2 Sheets-Sheet 1
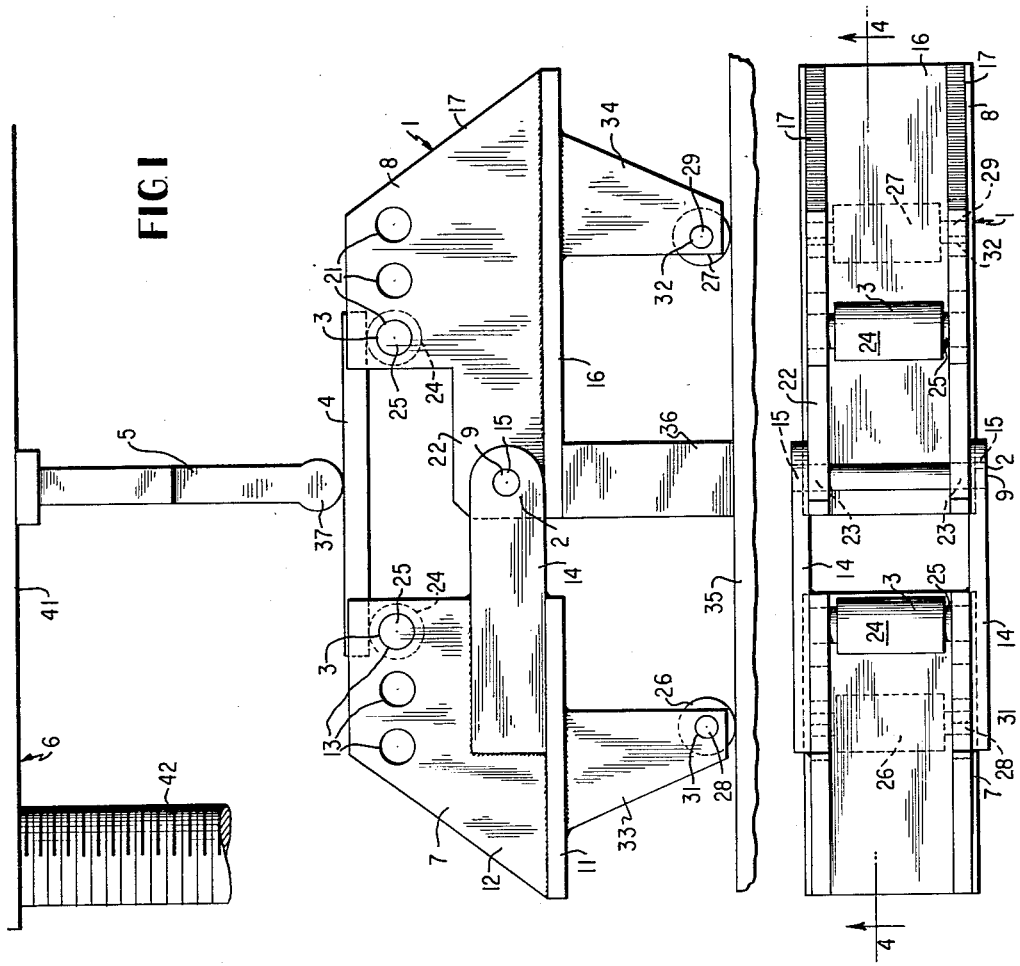
INVENTORS
ERNEST M. CRAM
NELSON G. BALL
BY Shanley & O'Neil
ATTORNEYS

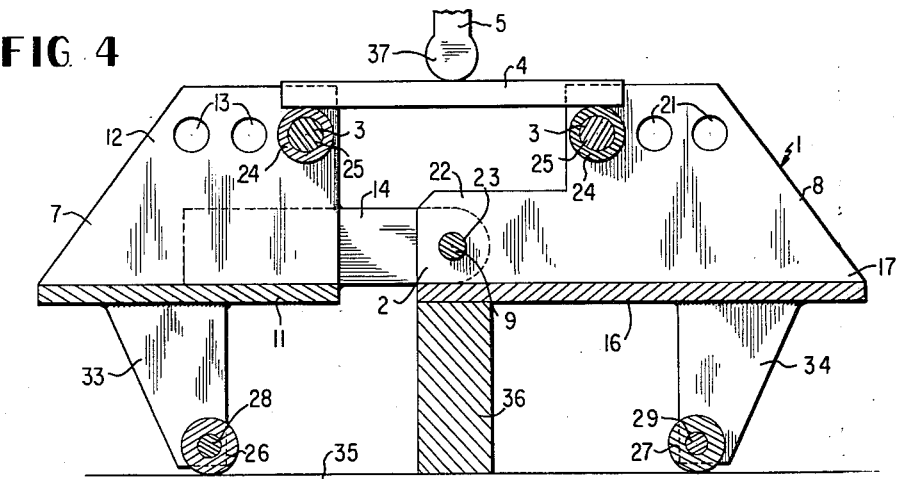
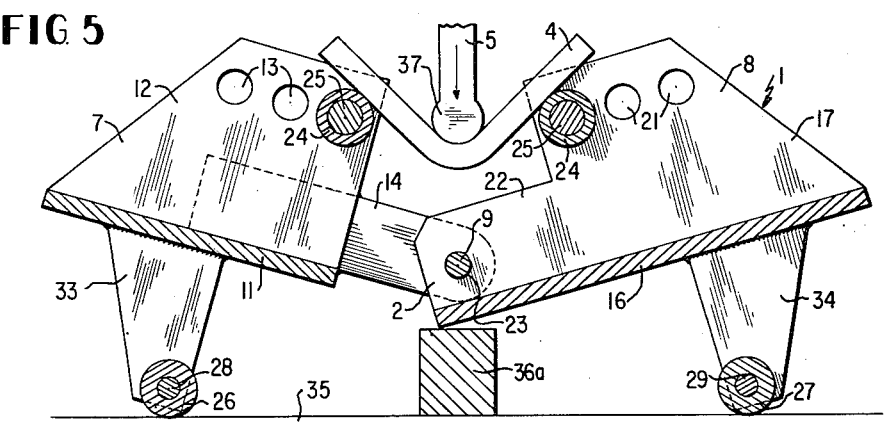
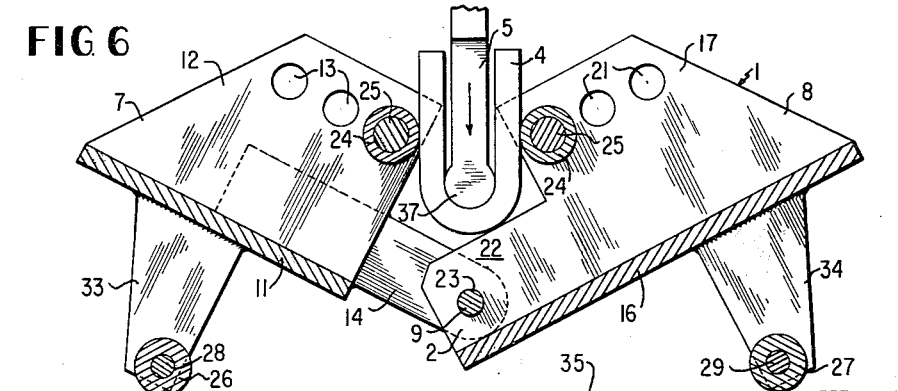

United States Patent Office 3,130,579
Patented Apr. 28, 1964

3,130,579
APPARATUS FOR BEND TESTING
ELONGATED SPECIMENS
Ernest M. Cram, Dearborn, and Nelson G. Ball, Trenton, Mich., assignors to National Steel Corporation, a corporation of Delaware
Filed May 22, 1961, Ser. No. 111,676
3 Claims. (Cl. 73—100)

This invention relates to a method and apparatus for bending elongated articles and more particularly to a method and apparatus for bending elongated metal articles. The invention is particularly adaptable for use in bending metal test specimens for purposes of physical testing.

In many instances it is desirable to bend elongated articles particularly metal articles in a simple, quick and efficient manner and to produce a bend with a uniform curvature. More particularly, certain physical tests for metals require bending of the elongated specimens in order to evaluate the ability of a material to undergo bending during operations to which it may be subjected. Generally, a bend test may be conducted as a "go-no-go" test, i.e. the specimen meets the desired bend requirement or fails by cracking. In some instances, a ductility value is derived from the bend test by placing gage marks on the outside or tension side of the bend and measuring the elongation after completing the bend.

Ordinarily, a bend test merely involves a determination of whether or not a specified bend can be made satisfactorily. A typical method of stating a bend test specification for plate material, for example, is as follows: "The bend test specimen shall stand being bent cold through 180° without cracking on the outside of the bent portion, to an inside diameter which shall have the following relation to thickness or gage of material." A set of bend diameters is then specified for various thickness ranges, bend diameters increasing with increasing plate thickness. Generally, in such specifications the method of bending is not specified and accordingly a large number of bending devices have been designed and developed for bending such specimens.

In general, the prior art apparatus comprises suitable means for supporting the ends of the test specimen and a suitable plunger having a curved end which is forced between the supports thus bending the specimen. Such apparatus has certain inherent disadvantages due to the inability to make the 180° bends required by many tests in a simple single stroke and thus additional operations and in some instances additional apparatus may be required, particularly if the specimen is of a high strength material with a high resistance to bending. Generally, a bend cannot be made unless the supports for the ends of the specimen are initially spaced apart a distance substantially greater than the outside diameter of the curved portion of the specimen after bending. However, where the supports are spaced apart such a distance the test specimen will pass through or between the supports before a 180° bend can be made. Where the supports are close enough together to permit bends approaching 180° before passage between the supports, i.e. a distance substantially equal to the outside diameter of the curved portion of the specimen after bending a tremendous if not impossible amount of force is required to bend the specimen. Thus, with such prior art devices it is necessary to employ additional steps and in some instances additional apparatus to complete a 180° bend.

Among the most important requirements of a testing device are simplicity and convenience whereby a large number of tests may be run simply and quickly. Accordingly, it is the purpose of this invention to provide a bending apparatus which permits bending elongated articles through a 180° angle in a manner whereby a large number of tests can be run in a relatively short time and wherein the bending can be done in a single stroke of the bending apparatus.

This invention will be described more particularly with reference to the accompanying drawings wherein like numerals represent like parts in the various views. In the drawings:

FIGURE 1 is a side elevational view of a bending apparatus embodying the principles of this invention;

FIGURE 2 is an end elevational view of the bending apparatus of FIGURE 1;

FIGURE 3 is a plan view of the bending apparatus of FIGURE 1;

FIGURE 4 is a sectional view along the line 4—4 of FIGURE 3 illustrating the bending apparatus in position for beginning the bending operation;

FIGURE 5 is the same view of the bending apparatus as FIGURE 4 illustrating the bending of the article part way through the bending operation; and FIGURE 6 is the same view of the bending apparatus as FIGURE 4 illustrating completion of the bending operation.

With reference now more particularly to FIGURES 1, 2 and 3, a testing apparatus for bending elongated metal test specimens embodying the principles of this invention is shown. This apparatus comprises a frame indicated generally at 1, provided with a centrally disposed hinge 2 and spaced support members 3 on either side of the hinge 2 for supporting an elongated article 4 during bending, a plunger 5 and means such as a compression testing apparatus, a portion of which is generally indicated at 6, for forcing the plunger 5 against the article 4 between the support members 3.

Frame 1 comprises two sections 7 and 8 centrally hinged together by means of hinge 2 including a pin 9. The left-hand section 7 comprises a suitable horizontal base plate 11, a pair of members or plate 12, affixed to base plate 11 by suitable means such as welding, extending away from base plate 11 at right angles thereto and provided with openings 13 in the upper portion thereof, having their centers on a line parallel to base plate 11. A pair of metal straps 14 are affixed to the outside of each member 12 by suitable means such as welding and extend away from the main portion of the left-hand section 7 to the right of the drawing. Straps 14 are provided with opening 15 through which pin 9 passes for hinging the two sections 7 and 8 together.

Right-hand section 8 is substantially the same as section 7 including a base plate 16, members 17 and openings 21. However, straps are not employed in section 8 but instead the members 17 have extensions 22 which may be disposed between the ends of straps 14 and which have openings 23 to permit passage of pin 9 for hinging the two sections 7 and 8 together.

As can be seen from FIGURE 1, support members 3 are mounted on frame 1 on either side of the hinge 2. Support members 3 have a curved surface to provide spaced parallel fulcrums for supporting the article 4. It is preferred to employ rollers 24 mounted on shafts 25 adapted to pass through any of the openings 13 or 21. By the provision of a plurality of openings 13 and 21, the rollers 24 may be positioned to accommodate a variety of lengths and thicknesses of specimens, or articles.

Frame 1 is supported on rollers 26 and 27 mounted on frame 1 below and on either side of the hinge 2. More particularly, rollers 26 and 27 are respectively mounted on shafts 28 and 29 which pass through openings 31 and 32 in pairs of members 33 and 34. Members 33 are affixed at right angles to base plate 11 of section 7 while members 34 are affixed to base plate 16 of section 8 by suitable means such as welding. Rollers 26 and 27 are adapted to be supported by a supporting surface 35 in a manner whereby movement of the hinge 2 toward the surface 35 results in movement of the rollers 26 and 27 over the surface 35 in a direction away from each other and the hinge 2 and in circumferential movement of the support members 3 about the hinge 2 toward each other. Conversely movement of hinge 2 away from surface 35 results in movement of rollers 26 and 27 toward each other and movement of support members 3 away from each other.

Adjustment of the distance between the supporting members 3 is accomplished by adjusting the distance between the hinge 2 and surface 35. Such adjustment may be accomplished where surface 35 is horizontal by supporting the hinge 2 in different positions relative to the supporting surface 35 by means such as blocks 36 and 36a as shown in FIGURES 1, 4 and 5.

The plunger 5 has an end portion provided with a curved surface 37 in the form of a cylindrical segment. The means, for forcing the plunger 5 against article 4 between support members 3, may comprise a conventional compression testing apparatus 6 wherein the plunger 5 is mounted in the upper movable member or jaw 41 of the testing machine. Thus when the upper member 41 is forced downward, for example by rotation of a plurality of screw members 42, as would be the case in compression testing, the plunger 5 is forced downward bending the specimen.

With reference more particularly to FIGURES 4–6 the operation of the apparatus of this invention will be described. In the beginning of the bending operation the hinge 2 is supported by a support or block 36 of sufficient height to maintain the base plates 11 and 16 substantially parallel to the supporting surface 35. The article or test specimen is supported on the fulcrums provided by rollers 24 which are spaced apart a distance substantially greater than the outside diameter of the curved portion of the specimen after bending. The plunger 5 is then forced against the specimen 4 to bend the specimen. As can be seen from the drawings if the fulcrums or rollers 24 are allowed to remain in the position shown in FIGURE 4 the specimen would pass between them before a 180° bend could be made. As bending progresses the fulcrums or rollers 24 are adjusted progressively in a circumferential direction about the axis of pin 9 to positions of decreased distance, between the fulcrums with simultaneous movement of the axis of pin 9 in a direction away from plunger 5, i.e. toward surface 35. For example, after the bending operation has proceeded the block 36 is removed and a smaller block 36a is provided in its place. The fulcrums or rollers 24 are moved toward each other in a circumferential direction about the axis of the pin 9 with simultaneous movement of the axis of pin 9 toward surface 12 to the position shown in FIGURE 5. With the rollers 24 positioned closer together it is possible to bend the specimen 4 a substantially greater amount without passing between rollers 24 than could have been done if the position of FIGURE 4 was maintained. On the other hand, if the position of FIGURE 5 was employed initially a much greater force would have been required to bend the specimen 4 due to a lesser mechanical advantage. As bending progresses further, the block 36a is removed permitting the hinge 2 to move further toward surface 35 whereby the rollers 24 are moved toward each other a sufficient distance to permit bending of specimen 4 in a complete 180° bend. While the operation of this invention has been shown in three successive steps, in some instances it may be desirable to employ as little as two steps, i.e. with block 36 and without block 36, or in some instances it may be desirable to use a large number of steps with a larger number of intermediate blocks.

It is understood that various changes and modifications may be made to the foregoing without departing from the spirit of the invention or the scope of the appended claims.

What is claimed is:

1. Apparatus for bend testing of elongated metal specimens comprising horizontally disposed rectilinear support means, frame means including two segments positioned for pivotal movement about a centrally disposed hinge means, specimen support members mounted on the frame means in fixed positional relationship with respect to the hinge means above and on either side of the hinge means, the specimen support members having a curvilinear surface for contacting a test specimen during bending, rotatable roller members mounted on the frame means in fixed positional relationship with respect to the hinge means below and on either side of the hinge means in contact with the rectilinear support means, plunger means having a curved specimen contact surface, and means independent of the frame means for forcing the plunger means against a specimen midway between the specimen support members; the horizontally disposed rectilinear supporting means being located to maintain the roller members in horizontally coplanar relationship during movement of the hinge means toward the supporting surface causing the roller members to move in a direction away from each other and the specimen support members to move in a direction toward each other with their curvilinear surfaces supporting longitudinal ends of a specimen during bend testing.

2. The apparatus of claim 1 including means for supporting the hinge means in succeeding positions progressively closer to the horizontally disposed rectilinear support means as bend testing progresses.

3. The apparatus of claim 1 including means for establishing differing fixed positional relationships of the specimen support members with respect to the hinge means to accommodate test specimens of various sizes.

References Cited in the file of this patent

FOREIGN PATENTS

| 892,354 | France | Jan. 7, 1944 |
| 920,942 | Germany | Dec. 2, 1954 |
| 68,924 | Norway | Feb. 26, 1945 |